(12) United States Patent
Siebenmorgen (10) Patent No.: US 10,989,909 B2
(45) Date of Patent: Apr. 27, 2021

(54) METHOD FOR PROVIDING AN OVERVIEW IMAGE

(71) Applicant: Carl Zeiss Microscopy GmbH, Jena (DE)

(72) Inventor: Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 112 days.

(21) Appl. No.: 16/414,399

(22) Filed: May 16, 2019

(65) Prior Publication Data

US 2019/0353885 A1    Nov. 21, 2019

(30) Foreign Application Priority Data

May 18, 2018 (DE) .......................... 102018207821.1

(51) Int. Cl.
    G06K 9/00 (2006.01)
    G02B 21/36 (2006.01)
    G06T 5/00 (2006.01)
    G02B 21/06 (2006.01)

(52) U.S. Cl.
    CPC .......... *G02B 21/367* (2013.01); *G02B 21/06* (2013.01); *G06K 9/00147* (2013.01); *G06T 5/009* (2013.01)

(58) Field of Classification Search
    None
    See application file for complete search history.

(56) References Cited

U.S. PATENT DOCUMENTS

2010/0310129 A1* 12/2010 Hopfner ................... G06T 7/60
                                                       382/104
2019/0078985 A1*  3/2019 Albrecht ................. G01N 1/36

FOREIGN PATENT DOCUMENTS

| DE | 10 2005 029 225 A1 | 3/2005 |
|----|---|---|
| DE | 10 2013 021 542 A1 | 6/2015 |
| DE | 10 2016 204 653 A1 | 9/2017 |
| EP | 3 029 507 B1 | 10/2017 |
| EP | 3 378 401 A1 | 9/2018 |

OTHER PUBLICATIONS

Prokop, Mathias, et al.; "Use of Maximum Intensity Projections in CT Angiography: A Basic Review"; Radiographics 1997; 17(2):433-451.
German Search Report dated Nov. 20, 2018.

* cited by examiner

*Primary Examiner* — Wei Wen Yang (74) *Attorney, Agent, or Firm* — Duane Morris LLP (57) ABSTRACT

A method for providing an overview image of an object that is arranged in a sample plane and includes generating a light sheet, capturing detection light coming from the sample plane, imaging the captured detection light by means of a detector in a detection plane in the form of image data of at least one captured image, wherein the captured image extends in an image plane that is inclined with respect to the sample plane, capturing a number of images of at least one region of the object, in the form of an inclined stack, and transforming the inclined stack to a normalized Z-stack, in which image data of the captured images are assigned with correct orientation with respect to the reference axis. A maximum intensity projection in the normalized Z-stack, wherein a resulting overview image is generated by way of selected image points being imaged as a virtual projection into a projection plane that is parallel to the image plane of the detector.

3 Claims, 6 Drawing Sheets

Fig. 1

Prior art

Fig. 2

METHOD FOR PROVIDING AN OVERVIEW IMAGE

RELATED APPLICATIONS

The present application claims priority benefit of German Application No. DE 10 2018 207 821.1 filed on May 18, 2018, the contents of which are incorporated by reference in its entirety.

FIELD OF THE INVENTION

The invention relates to a method for providing an overview image, in particular in a microscopy method, using a light sheet.

BACKGROUND OF THE INVENTION

Overview images are provided for example before, during or after the capturing of image data of an object to provide a user of a method or of an apparatus for capturing image data with a quick overview of the object. The overview image can be used, for example, to select regions to be imaged (region of interest, ROI) and/or assess the quality of captured image data.

Possible methods known from the prior art for providing an overview image are what are known as maximum intensity projection (MIP) and minimum intensity projection. The following text will discuss maximum intensity projection, also referred to as MIP for short.

Figure 1:
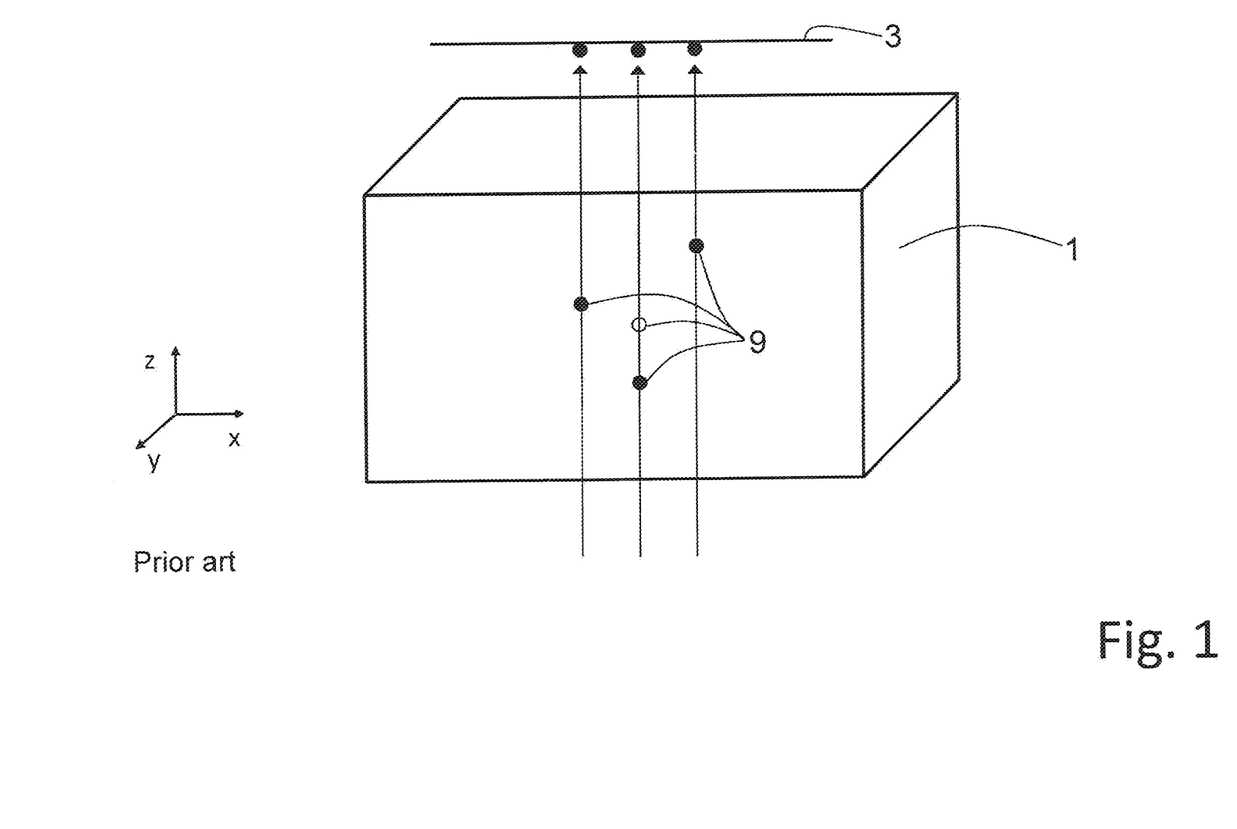
FIG. 1 is a schematic illustration of the principle of maximum intensity projection according to the prior art.

The principle of MIP (standard MIP) is illustrated highly schematically in FIG. 1. Image data 9 are captured at the same time or sequentially in the volume of an object 1, for example a biological sample. Said image data 9 represent for example markers 2 of differing intensities. The markers 2 can for example be structures or molecules, which are provided with a light-emitting dye and which have been excited to emit for example fluorescence radiation by means of excitation radiation. The emission locations and the respective intensities of the emitted detection radiation were captured. The term "marker" within the meaning of this description comprises both the dye and a structure which has been marked therewith or a molecule which has been marked in this way.

If a bundle of mutually parallel axes is virtually placed through the object 1 (shown by way of example by arrows), it is possible for the image points having the highest (maximum) intensity to be projected onto a projection plane 3 extending along each of the axes. For the sake of simplicity, markers 2 and image points are here equated, unless this description expressly mentions a different meaning. If markers 2 having a low intensity and markers 2 having a high intensity are located here on one of the axes, it is in each case the marker 2 having the higher intensity that is projected, while the marker 2 having the lower intensity is overlaid by the region 2 having the higher intensity and is not shown. FIG. 1 shows markers 2 of higher intensity in each case as a solid circle and markers 2 having lower intensity as an empty circle.

The MIP permits fast establishment of an overview image with relatively low computational outlay. The information relating to the two-dimensional position of the respective markers 2 remains intact, while the information relating to the spatial orientation of the markers 2 is lost. If a plurality of MIPs are performed from different directions, it is possible to produce an overview image which can be rotated, if required, in different observation directions.

DE 10 2005 029 225 A1, which discloses a system and a method for producing maximum/minimum intensity projections, is mentioned here merely by way of example.

Uses of the MIP in the field of medical imaging are described for example in Prokop, M. et al. (1997: Use of Maximum Intensity Projections in CT Angiography: A Basic Review; RadioGraphics 1997, 17: 433-451).

SUMMARY OF THE INVENTION

The invention is based on the object of specifying an improved possibility for producing an overview image in light sheet microscopy.

The object is achieved by a method according to claim 1. Advantageous embodiments are the subject matter of the dependent claims.

The method serves for providing an overview image of an object, for example a biological sample, that is arranged in a sample plane. The method includes the following steps A to F, which are performed in succession. In further configurations of the method, further steps and/or intermediate steps may be performed.

In step A, a light sheet is generated, wherein the light sheet is generated along a first optical axis and at least partially on the sample plane. In step B, light coming from the sample plane (detection light) is captured along a second optical axis, wherein the first optical axis and the second optical axis intersect in the sample plane and together enclose a right angle. In addition, the first optical axis and the second optical axis each enclose an angle which differs from zero with a reference axis that is orthogonal to the sample plane.

In step C, the captured light is imaged by means of a detector in a detection plane in the form of image data of at least one captured image, wherein the captured image extends in an image plane that is inclined with respect to the sample plane. The inclination corresponds to the inclination of the first optical axis with respect to the sample plane. Furthermore, in step D, a number of images of at least one region of the object are captured by moving the light sheet in the sample plane in a relative movement of the light sheet and the object. The relative movement can be incremental or continuous or be a sequential combination of both possibilities. The captured images, which are inclined with respect to the sample plane, form an inclined stack of images. The image planes are parallel with respect to one another.

In step E, the inclined stack is virtually transformed to a normalized Z-stack, in which image data of the captured images are assigned with correct orientation with respect to the reference axis. This process is also referred to as "deskewing." An observation of illustrations, in particular of layers and/or regions of the normalized Z-stack is effected preferably along the reference axis or an axis that is parallel thereto.

In step E, a maximum intensity projection is performed in the normalized Z-stack, wherein all image points which are located one behind the other along the optical axis, or along axes which are parallel thereto, are evaluated with respect to their respective intensity along the optical axis of the detection objective, that is to say along the second optical axis, and the image point having the highest intensity is selected along each axis. In the process of selecting the image points, optionally a lower threshold value of the intensity can be fixed, below which no selection is performed.

A resulting overview image is generated in step F by way of each of the selected image points being imaged as a virtual projection into a projection plane that is parallel to the image plane of the detector.

For the sake of simplicity, a surface of a sample carrier, for example a glass or a sample stage, is equated in this description with the sample plane.

Image points are here also understood to mean picture elements (pixels). For example, the detector can have a specific resolution (pixels per unit area). The intensity of a picture element or of a pixel is understood to mean the intensity of an image point.

A light sheet in the field of microscopy, in particular high-resolution microscopy and/or fluorescence microscopy, is understood to mean a space which is illuminated in the shape of a plate or a sheet. The spatial alignment of the light sheet is preferably defined by the propagation direction of illumination radiation that is formed to be the light sheet.

The light sheet is the region of an illumination beam path provided for illuminating the sample volume, in which region the illumination radiation does not exceed a spatial extent of e.g. 10 µm measured in the detection direction or in the direction of the optical axis of a detection objective and in which it is therefore suitable for detecting or measuring a sample volume according to the principle of light sheet microscopy.

It has been found in practicing light sheet microscopy that secondary maxima (also referred to as "side lobes") can frequently occur in the generation of a light sheet. These secondary maxima extend substantially parallel to the actual light sheet, in terms of their effect represent individual light sheets, and have a lower radiation intensity than the actual light sheet. Despite the lower radiation intensity, the secondary maxima can result for example in the excitation of emitting markers or the reflection of the illumination radiation. As a result of these undesirable excitations and emissions or reflections, the detector captures additional image data which, in a resulting image, in this case a resulting overview image, give rise to regions or structures which are imaged out of focus, and/or ghost structures. Ghost structures are image data which suggest structures of the object to be imaged which are not present or result in imaging of structures at incorrect locations.

The performance of the MIP in the normalized Z-stack along the optical axis of the detection objective leads to the advantageous effect that at least a portion of the incorrectly captured regions or structures are overlaid by actual structures having a higher intensity. The result is an improved overview image. An image obtained by means of the method according to the invention is here also referred to as an LSFM-MIP.

In an advantageous configuration of the method, the overview image, more specifically the image data thereof, is captured as an overview image data set. In step G, a copy of the overview image data set is established, as a copy image data set, with a contrast that is reduced with respect to the contrast of the resulting overview image. The image data of the copy image data set are offset against the respectively corresponding image data of the overview image data set in pixel-wise fashion, such that a calculated overview image having a contrast that is increased with respect to the resulting overview image is obtained. This procedure is known in the field of image processing as "unsharp-masking."

The resulting overview image or the calculated overview image can be transformed to an image plane extending orthogonally to the reference axis. Owing to such a transformation, the respective overview image is such as if the user looked onto the overview image along the reference axis. Consequently, intuitive use and interpretation of the overview image for the user are made easier.

BRIEF DESCRIPTION OF THE DRAWINGS

The invention will be explained in more detail below on the basis of figures and exemplary embodiments. In the figures.

DETAILED DESCRIPTION OF EMBODIMENTS OF THE INVENTION

Figure 2:
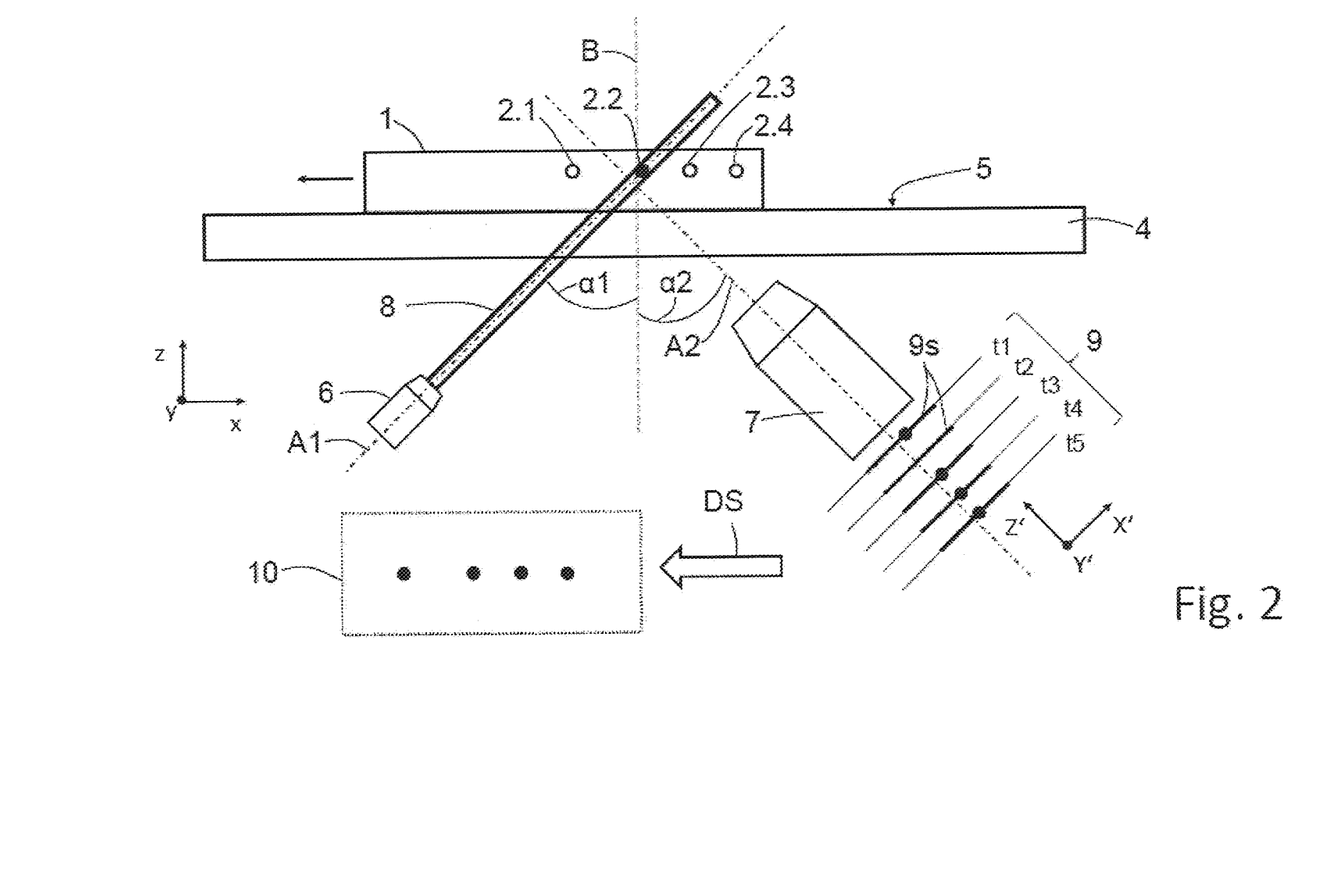
FIG. 2 is a schematic illustration of an arrangement for light sheet microscopy and of selected method steps for image data capturing and image processing.

FIG. 2 shows, in simplified fashion, an arrangement for light sheet microscopy. An object 1 to be imaged is arranged on a sample carrier 4 having an upward-facing surface that serves as a sample plane 5. An illumination objective 6 is directed with its first optical axis A1 through the sample carrier 4 into the sample plane 5 and into the object 1. The illumination objective 6 is configured such that, by means of it and possible further elements (not illustrated here) such as a cylindrical lens or a scanner, a light sheet 8 can be generated along the first optical axis A1 and perpendicularly to the drawing plane. The light sheet 8 is therefore shown in cross section.

A detection objective 7, which is likewise present, is likewise directed with its optical axis, which is referred to as the second optical axis A2, through the sample carrier 4 into the sample plane 5 and the object 1. The first optical axis A1 and the second optical axis A2 intersect in the sample plane 5 and are at an angle of 90° with respect to one another. For the sake of simplicity, the space above the upward-facing surface of the sample carrier 4 is likewise referred to as the sample plane 5. A focal position or focal plane of the detection objective 7 coincides with the light sheet 8, such that a region located in the light sheet 8 is imaged sharply into an image plane by means of the detection objective 7 and is referred to as a region of sharply imaged image data 9s. The region of sharply imaged image data 9s is visualized by a thick solid line (see below).

FIG. 2 indicates two coordinate systems. The Cartesian coordinate system with the axes x, y and z is related in particular to the sample carrier 4, the sample plane 5, and the reference axis B. The sample plane 5 extends in an x-y-plane which is defined by the axes x and y (x-axis and/or y-axis), while the reference axis B extends in the direction of the axis z (z-axis). This coordinate system is also referred to as the coordinate system of the normalized Z-stack 12 (see FIG. 3).

A second coordinate system with the axes X', Y' and Z' relates in particular to the first and the second optical axes A1 and A2. The first optical axis A1 is directed parallel to an X'-Y'-plane defined by the two axes X' and Y'. The second optical axis A2 is directed in the direction of the axis Z'. This coordinate system is also referred to as the detection coordinate system 11 (see FIG. 3).

Both the first optical axis A1 and the second optical axis A2 enclose in each case an angle with respect to a reference axis B, which is perpendicular to the sample plane 5, which differs from zero, referred to here as α1 and α2.

For example, four approximately spherical object regions situated on the same horizontal are shown in the object 1. These object regions are proteins which are marked for example with a fluorescent dye and will therefore be referred to below as markers 2.1 to 2.4 for reasons of simplicity. The fluorescent dye is excitable by means of the illumination radiation of the illumination objective 6 and the light sheet 8 and, in the excited state, emits fluorescent radiation as the detection radiation. The latter is captured by means of the detection objective 7 along the second optical axis A2 as image data 9. The excitation of the fluorescent dyes and the emission of the detection radiation take place only if the corresponding marker 2.1 to 2.4 is located within the light sheet 8.

The object 1 is moved relative to the light sheet 8 along the sample plane 5 (symbolized by an arrow). In each case image data are captured in the process at different time points t1 to t5 and in each case stored as captured image data 9.

Figure 4:
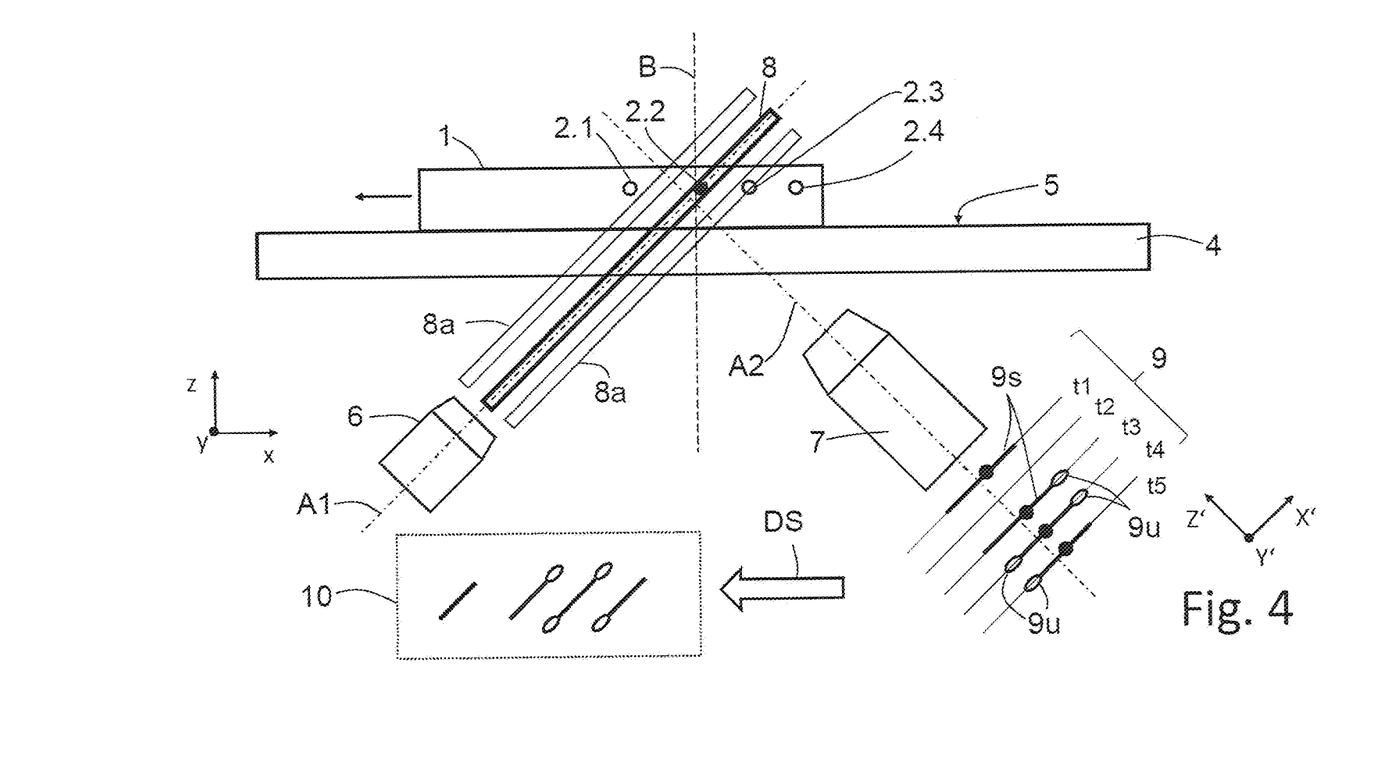
FIG. 4 is a schematic illustration of an arrangement for light sheet microscopy and of selected method steps according to the invention for image data capturing and image processing.

FIG. 2 shows by way of example the capturing of the image data 9 at the time point t3. At a time point t1, which occurred in the past, the marker 2.1 was located within the light sheet 8. The detection radiation emitted by said marker 2.1 was captured and assigned to the time point t1 together with a two-dimensional position in an image plane. The image plane is shown by way of example by a thin solid line parallel to the X'-Y'-plane and for example corresponds to the detection surface of a detector which is likewise not shown. The spatially resolved capturing of the respective marker 2.1 to 2.4 is symbolized in each case by a solid circle. FIGS. 2 and 4 schematically show the image plane assigned to the individual time points t1 to t5 for the sake of clarity. The detector used permits two-dimensional positioning of the region 2 by ascertaining the origin of the captured detection radiation. This can be effected, by way of example, by means of a position-sensitive detector having an array of detection elements (matrix).

At the time point t2, none of the markers 2.1 to 2.4 was situated within the light sheet 8, and as a result no corresponding image data 9 were captured and the image plane is shown merely as a line with the region of sharply imaged image data 9s. At the time point t3, the second marker 2.2 moved into the light sheet 8 and emits detection radiation, which is captured as image data 9 and saved. The same takes place at time points t4 and t5 with the markers 2.3 and 2.4.

Figure 6:
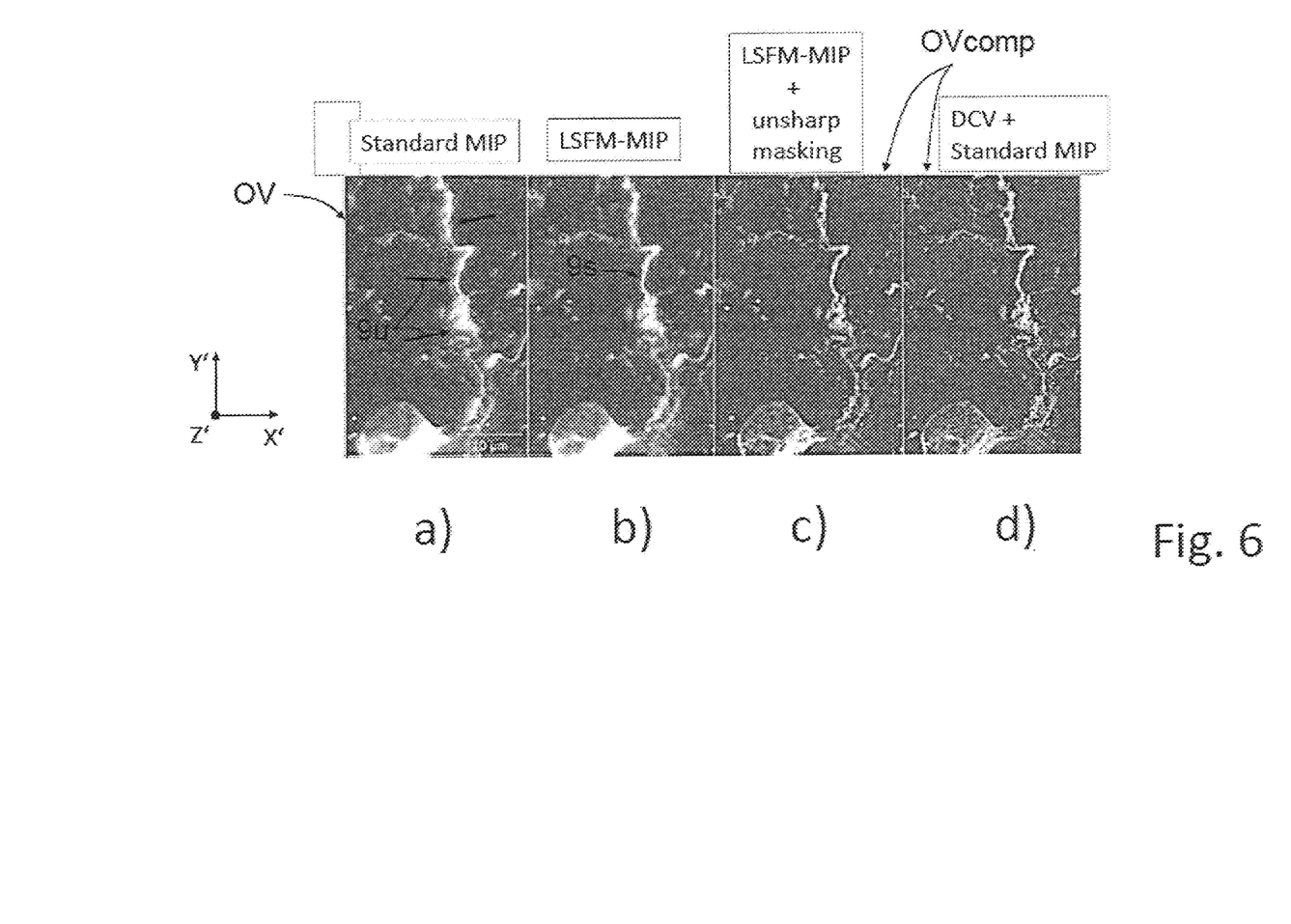
FIG. 6 illustrates object detail and resulting overview images: a) using an MIP according to the prior art, b) an MIP according to a first configuration of the method according to the invention, and c) of a calculated overview image of a second configuration of the method according to the invention, and d) of an overview image using a deconvolution step and an MIP according to the prior art.

In order to be able to offer an intuitively interpretable overview image OV (see FIGS. 3 and 6) to a user of the arrangement for light sheet microscopy, the captured image data 9 are transferred to a normalized Z-stack 10. To this end, the captured image data 9 are transformed by way of calculation to the virtual normalized Z-stack 10 by means of a method step which is referred to as deskew DS. If the user arranges for in each case one portion or a, preferably horizontal, layer of the normalized Z-stack 10 to be presented, they will be given the impression of looking onto the now digitized object 1 along the reference axis B, for example. The image data 9 of the markers 2.1 to 2.4 are preferably shown in a laterally and positionally correct manner.

Figure 3:
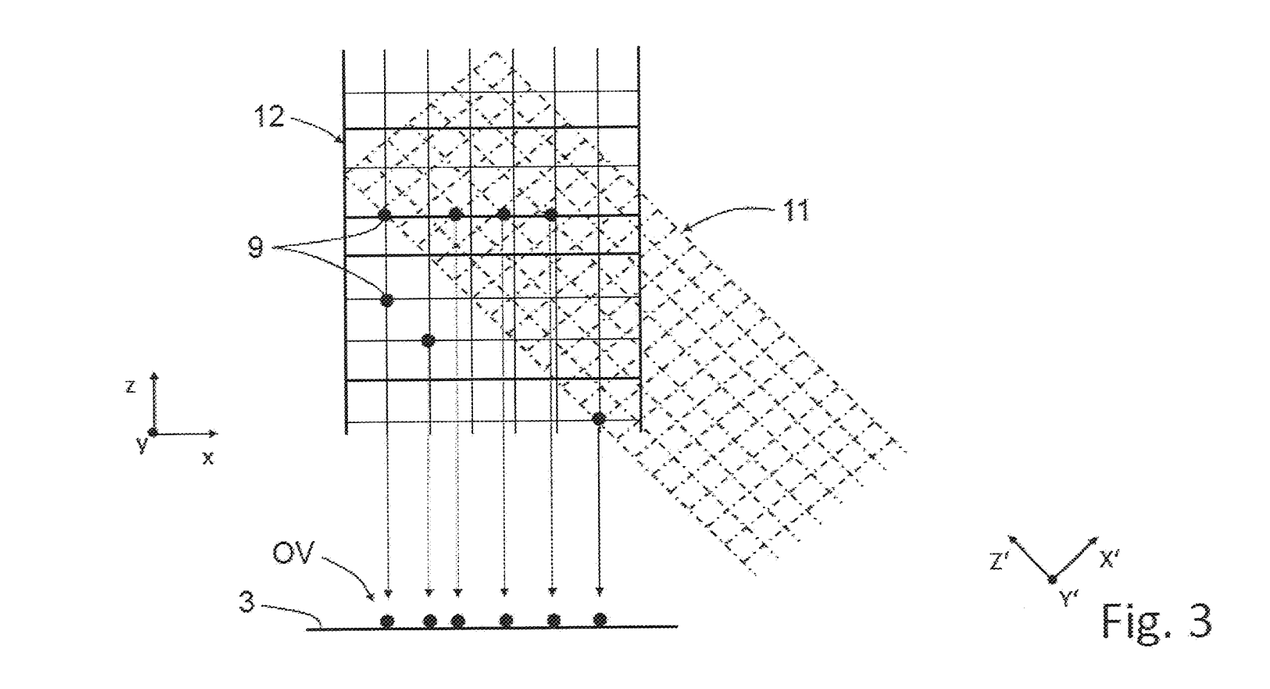
FIG. 3 is a schematic illustration of selected method steps of image processing and production of an overview image.

FIG. 3 illustrates the method steps of the transformation of the captured image data 9 from a detection coordinate system 11 to a coordinate system 12 of the normalized Z-stack 10. The detection radiation captured by means of the detection objective 7 is captured in a spatially resolved manner, as is shown schematically in FIG. 2, such that the location information of the markers 2.1 to 2.4 are present in the form of image data 9 in a detection coordinate system 11. This is shown schematically by interrupted solid lines and has an inclination corresponding to the inclination of the second optical axis A2 (see FIGS. 2 and 4). For purposes of clarity, the detection coordinate system 11 and coordinate system 12 do not entirely overlap one another.

A coordinate system 12 of the normalized Z-stack 10 is defined, and the coordinates of the image data 9 are transferred, in particular converted, from the detection coordinate system 11 to the coordinate system 12. If appropriate, missing image data 9 are supplemented by way of interpolation or other known methods.

It is then possible to perform an MIP along the z-axis, as was described in principle above with reference to FIG. 1. The respectively highest intensities of the image data 9, located in each case along an axis (symbolized by arrows) are projected into a projection plane 3, and an overview image OV is obtained.

Significant for the invention are imaging aberrations which can be caused by undesired secondary maxima 8a of the light sheet 8. These secondary maxima 8a, also referred to as side lobes, are shown schematically in FIG. 4.

If the object 1 and light sheet 8 are then displaced relative to one another, as already mentioned with respect to FIG. 2, and image data 9 are captured at time points t1 to t5, additional image data 9 erroneously occur. FIG. 4 shows again the time point t3 by way of example. The second marker 2.2 is situated within the light sheet 8. At least one fluorescent dye, excited by the illumination radiation of the light sheet 8, emits detection radiation which is captured in the form of image data 9 in spatially and temporally resolved fashion by means of the detection objective 7. However, at the time point t3, the third marker 2.3 is already illuminated by illumination radiation of one of the secondary maxima 8a and excited to emit detection radiation. That means that, at the time point t3, in addition to the image data 9 of the second marker 2.2, image data 9 of the third marker 2.3 are now also captured, wherein the detection radiation thereof is captured in the form of image data 9 of lower intensity and sharpness owing to the lower intensity of the illumination radiation of the secondary maximum 8a and the fact that the third marker 2.3 is not situated in the focal plane of the detection objective 7. The detection radiation of locations outside the focal plane, caused by the effect of one of the secondary maxima 8a, represent images of image data 9u which have been imaged out of focus and are symbolized by empty ovals.

In deviation from FIG. 2, at each of the time points t1 to t5, which were selected by way of example, regions of sharply imaged image data 9s are represented in the form of a thick solid line and regions of image data 9u that have been imaged out of focus are possibly represented schematically. At the time point t4, the second and fourth markers 2 are even situated within the secondary maxima 8a, with the result that, in addition to the regions of the sharply imaged image data 9s from the focal plane, two regions of image data 9u that have been imaged out of focus are captured.

After capturing of the image data 9, 9s, 9u, the step of deskewing DS is performed and, as described above, a normalized Z-stack 10 is produced. For the further explanations relating to the method according to the invention, only the regions of sharply imaged image data 9s and the regions of image data 9u that have been imaged out of focus will be presented below.

Figure 5:
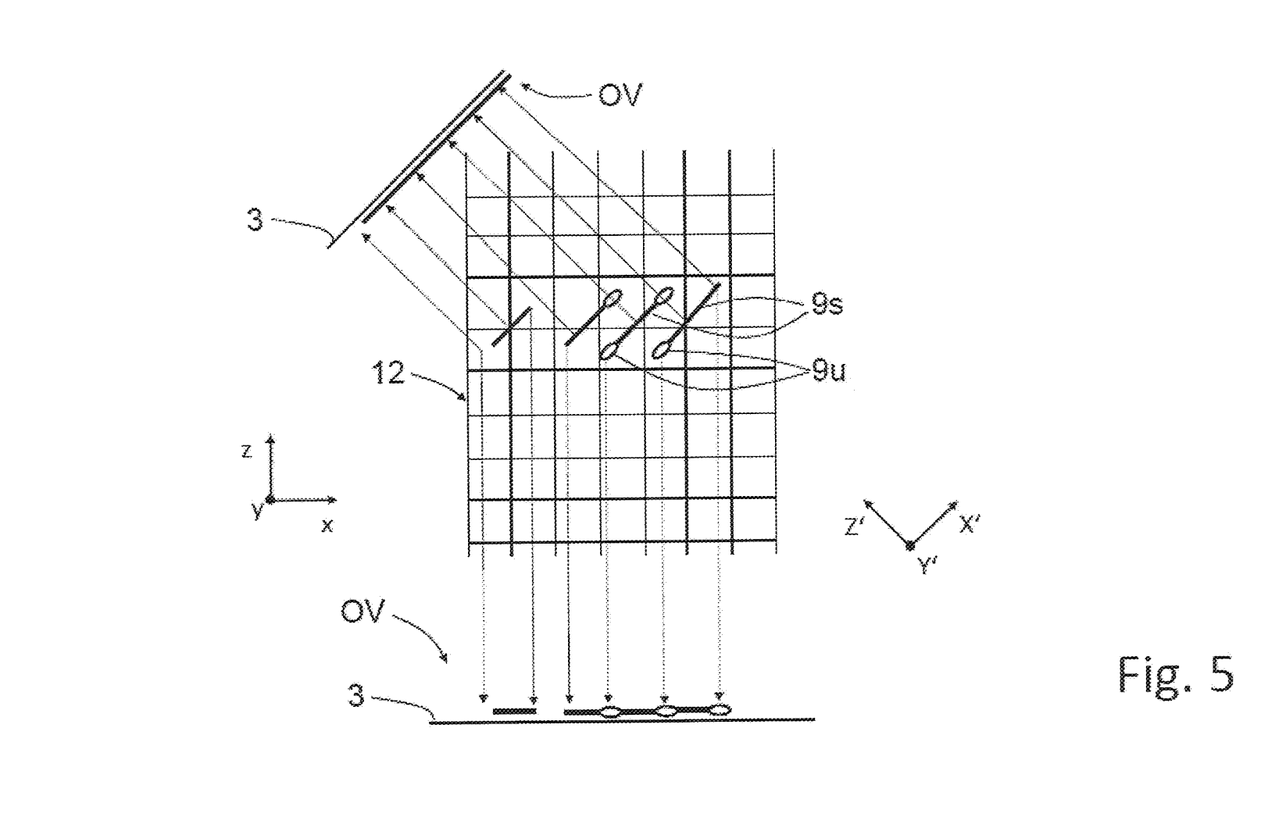
FIG. 5 is a schematic illustration of selected method steps of the invention for image processing and production of a resulting overview image.

For the sake of clarity, FIG. 5 is restricted to the coordinate system 12 of the normalized Z-stack 10. If an MIP is performed, as explained with respect to FIG. 3, an overview image OV is obtained, to which for example not only regions of sharply imaged image data 9s contribute, but also three regions of image data 9u that have been imaged out of focus.

If, by contrast, the MIP is performed in the direction of the second optical axis A2 (see FIGS. 2 and 4), many—in the present case even all—regions of image data 9u that have been imaged out of focus are covered in the projection direction by regions of sharply imaged image data 9s. The projection plane 3 used in a method according to the invention and an overview image OV obtained by means of said method are shown inclined at the top left.

The overview image OV can be transformed to an image plane extending orthogonally to the reference axis to make it possible again for the user to look in the direction of the z-axis.

Consequently, the method according to the invention is used to obtain an overview image OV to which fewer regions of image data 9u that have been imaged out of focus have contributed than is the case when performing an MIP along the z-axis.

The practical effect of the invention is illustrated in FIGS. 6a) to 6d). FIG. 6a) shows an overview image OV of a section of an object 1 that has been created using a maximum intensity projection, referred to as standard MIP, as was described above with respect to FIGS. 2 and 3. The secondary maxima 8a for example give rise to the regions of image data 9u that have been imaged out of focus, said regions having been indicated by arrows.

By contrast, in FIG. 6b), the overview image OV has been produced by means of a first configuration of the method according to the invention, as has been explained with respect to FIGS. 4 and 5 (LSFM-MIP). The proportion of regions of image data 9u that have been imaged out of focus in the overview image OV is significantly reduced. The overview image OV appears sharper, with higher contrast, and shows more details of the imaged structures. Indicated by way of example is a region of sharply imaged image data 9s, which in FIG. 6a) was still greatly influenced by regions of image data 9u that have been imaged out of focus.

In a further configuration of the method according to the invention, the resulting overview image OV is not presented but captured as an overview image data set.

In step C, a copy of the resulting overview image OV is created as a copy image data set, wherein said copy has a contrast which is reduced with respect to the contrast of the resulting overview image OV. The respectively corresponding image data of the overview image data set are subtracted in pixel-wise calculation from the image data of the copy image data set, such that a calculated overview image OVcomp having a contrast that is increased with respect to the resulting overview image is obtained. Such a calculated overview image OVcomp is shown in FIG. 6c).

The overview image OV of the LSFM-MIP and the calculated overview image OVcomp are somewhat longer in the direction of the X'-axis than in the case of a standard MIP. If the image of the LSFM-MIP is compressed in the direction of the X'-axis, it is possible to produce an image that appears like a standard MIP in terms of the dimensions. The factor of the necessary compression is here dependent on the height and on the length of the imaged object 1. Such compression was performed in the images of FIGS. 6b) and 6c).

FIG. 6d) shows the section of the object 1 after application of a deconvolution process (DCV) following the performance of an MIP in accordance with FIG. 6a). If such an MIP is applied to a Z-stack obtained in accordance with the prior art, which was previously deconvolved, no secondary maxima are visible anymore. FIG. 6d) shows that, despite the lower computational outlay, qualitatively comparable overview images can be obtained by means of the method according to the invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE NUMERALS

1 Object
2 (Excited) marker
3 Projection plane
4 Sample carrier
5 Sample plane
6 Illumination objective
7 Detection objective
8 Light sheet
8a Secondary maxima, side lobes
9 Image data
9s Sharply imaged image data
9u Image data that have been imaged out of focus
10 Normalized Z-stack
11 Detection coordinate system
12 Coordinate system (of the normalized Z-stack 10)
A1 First optical axis
A2 Second optical axis
B Reference axis
DS Deskew (method step)
OV (Resulting) overview image
OVcomp Calculated overview image
α1 Angle (between first optical axis A1 and reference axis B)
α2 Angle (between second optical axis A2 and reference axis B)

What is claimed is:
1. Method for providing an overview image of an object that is arranged in a sample plane, comprising the steps:
   step A: generating a light sheet, wherein the light sheet is generated along a first optical axis and at least partially on the sample plane,
   step B: capturing detection light, coming from the sample plane, along a second optical axis, wherein the first optical axis and the second optical axis intersect in the sample plane and together enclose a right angle, and the first optical axis and the second optical axis each enclose an angle which differs from zero with a reference axis that is orthogonal to the sample plane, step C: imaging the captured detection light by means of a detector in a detection plane in the form of image data of at least one captured image, wherein the captured image extends in an image plane that is inclined with respect to the sample plane, step D: capturing a number of images of at least one region of the object by moving the light sheet in the sample plane in a relative movement of the light sheet and the object, wherein the captured images are inclined with respect to the sample plane and form an inclined stack, step E: transforming the inclined stack to a normalized Z-stack, in which image data of the captured images are assigned with correct orientation with respect to the reference axis, and step F: performing a maximum intensity projection in the normalized Z-stack, wherein all image points which are located one behind the other along the second optical axis, or along axes which are parallel thereto, are evaluated with respect to their respective intensity and the image point having the highest intensity is selected along each axis, and a resulting overview image is generated by way of each of the selected image points being imaged as a virtual projection into a projection plane that is parallel to the image plane of the detector.

2. Method according to claim 1, further comprising capturing the resulting overview image as an overview image data set,
wherein, in a step G, a copy of the overview image data set is established, as a copy image data set, with a contrast that is reduced with respect to the contrast of the resulting overview image, and
the image data of the copy image data set are offset against the respectively corresponding image data of the overview image data set, such that a calculated overview image having a contrast that is increased with respect to the resulting overview image is obtained.

3. Method according to claim 1, wherein the overview image is transformed to an image plane extending orthogonally to the reference axis.

* * * * *

UNITED STATES PATENT AND TRADEMARK OFFICE
CERTIFICATE OF CORRECTION

PATENT NO. : 10,989,909 B2
APPLICATION NO. : 16/414399
DATED : April 27, 2021
INVENTOR(S) : Jörg Siebenmorgen Page 1 of 1

It is certified that error appears in the above-identified patent and that said Letters Patent is hereby corrected as shown below:

In the Specification

Column 7, Line 55    now reads: "In step C, a copy of the resulting overview image OV is"
should read -- In step G, a copy of the resulting overview image OV is --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*